UNITED STATES PATENT OFFICE 2,592,176

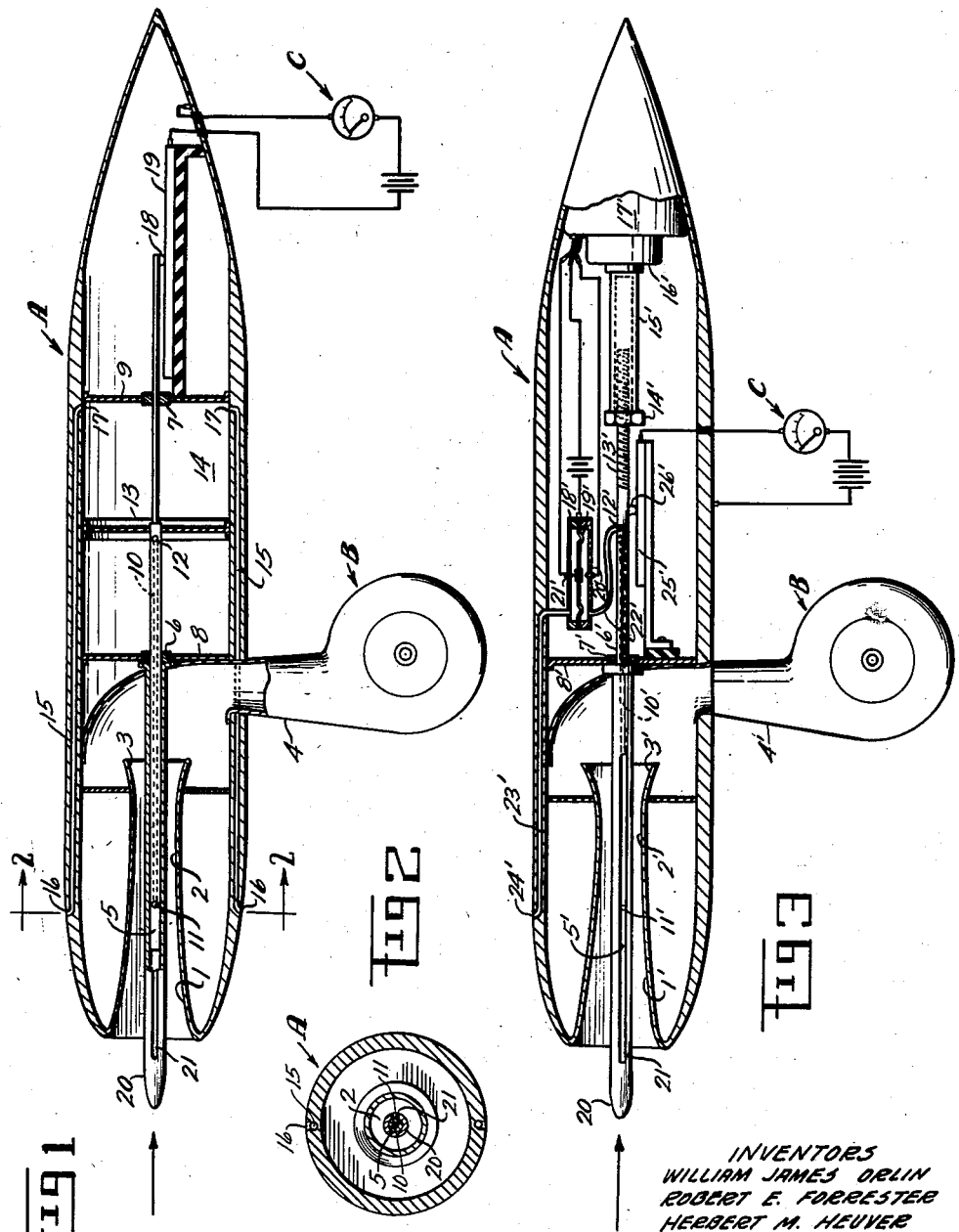

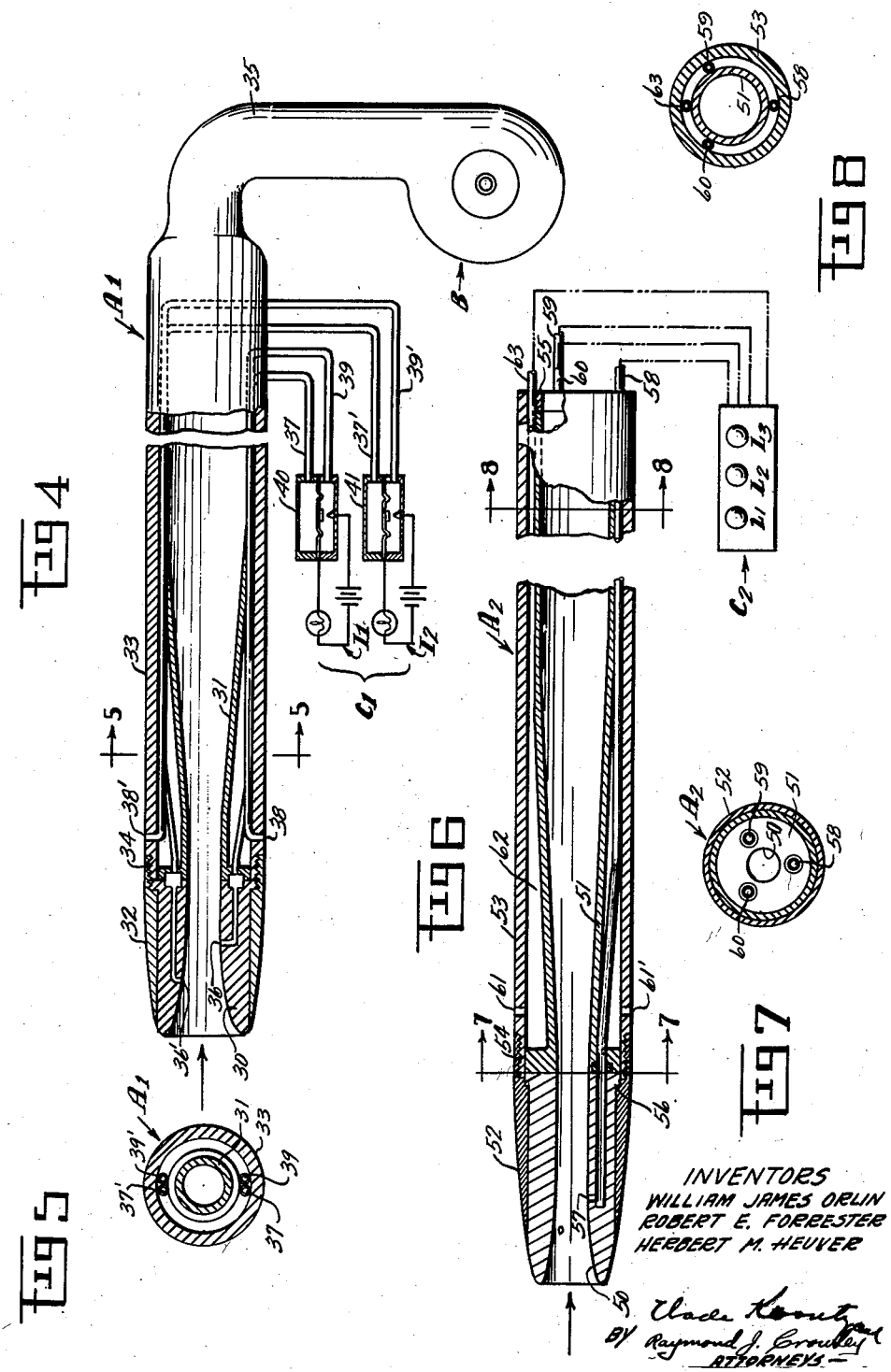

APPARATUS FOR INDICATING AIR SPEED IN TERMS OF THE LOCAL SPEED OF SOUND

William James Orlin, Hilton Village, Va., Herbert M. Heuver, Dayton, Ohio, and Robert E. Forrester, Flint, Mich.

Application February 19, 1946, Serial No. 648,720

9 Claims. (Cl. 73—205)

This invention relates to a means for determining and indicating the velocity of a relatively moving air stream in terms of the local velocity of sound.

The gradual development of aircraft has brought about increasing speeds of such craft relative to the surrounding air. In many cases this speed is approaching or even reaching the speed of sound, and as this point is reached a factor known as "compressibility" becomes of great importance in the continued safe operation of the aircraft. At speeds approaching the local speed of sound the air does not flow smoothly around an object, even one of streamlined form, and the air becomes compressed ahead of the object, with the result that shock waves form and destroy the normal air flow around air lift and control surfaces. Since the local speed of sound represents a critical speed in aircraft operation, it is convenient to evaluate the relative air velocity in terms of the local velocity of sound. The ratio of the relative air speed to the local speed of sound is known as the Mach number, the term being taken from the name of a physicist who pointed out the ratio and its usefulness.

It has been proposed to obtain the Mach number by applying altitude, temperature and other corrections to the reading obtained by an air speed indicator, which reading must then be divided by the local speed of sound to obtain the Mach number. This method is apt to prove cumbersome and complicated.

In accordance with the present invention it is a primary object to provide a simplified means to accurately indicate the relative velocity of air with respect to the local velocity of sound.

Another object of the invention is to provide apparatus of the type described which is adapted for use on aircraft, and which may be used as well in wind tunnel measurements.

A still further object is to generally improve and extend the usefulness of apparatus capable of indicating Mach numbers.

The above stated and other objects will become apparent from a reading of the following detailed description and accompanying drawings, wherein:

Fig. 1 is a longitudinal view partly in cross section illustrating the principal working parts of one form of indicating device.

Fig. 2 is a sectional view taken on line 2—2 of Fig. 1.

Fig. 3 is a longitudinal view partly in cross section illustrating an indicating device similar to that of Figs. 1 and 2 but having a modified arrangement for operation of the central slidable probe.

Fig. 4 is a longitudinal view partly in cross section of a modified indicating device which employs a minimum of moving parts.

Fig. 5 is a sectional view taken on line 5—5 of Fig. 4.

Fig. 6 is a longitudinal view partly in cross section of a modified and simplified form of indicating apparatus similar to that of Figs. 4 and 5.

Fig. 7 is a cross sectional view on line 7—7 of Fig. 6.

Fig. 8 is a cross sectional view on line 8—8 of Fig. 6.

Considering the embodiment of the invention as illustrated in Figs. 1 and 2, the indicating apparatus comprises three main units, namely a housing unit A, a vacuum pump B and an indicator unit C. The housing unit A of generally streamlined shape, is intended to be suitably secured to a support and to be exposed to relatively moving air flowing around and past the unit, from the larger open end toward the smaller closed end. At the forward end of the unit A there is a converging nozzle or choke 1 opening into a throat section 2, the latter connecting with a diffuser 3 of rearwardly diverging formation. The diffuser extends into a chamber having a duct 4 connected thereto, which forms the inlet to vacuum pump B. The nozzle, throat and diffuser together form a Venturi tube. By the use of a high degree of vacuum in the chamber rearwardly of the throat and diffuser a substantial pressure drop between the nozzle entrance and the throat is insured, thus causing the air to flow through the throat section at a speed approximating the local speed of sound. As long as the pressure drop is held above a certain minimum value, depending on the Venturi tube design, the proper velocity in the Venturi throat will be maintained even while the vacuum produced by pump B varies considerably.

Slidably mounted in the unit A along the longitudinal axis thereof is a probe element 5 supported in bearings 6 and 7 carried by partition walls 8 and 9. The probe includes a longitudinal passage 10 connected to ports 11 and 12, and secured on the probe at one side of port 12 is a piston 13 slidable with a close fit in chamber 14 formed by the walls 8 and 9 and by the hollow interior of housing unit A. The forward port 11 in probe 5 is slidable between the forward end of nozzle 1 and the throat section 2.

The outer wall of unit A is provided with lengthwise extending passages 15 opening at their forward ends to static pressure apertures 16, and at the opposite ends to ports 17 in the side walls of chamber 14, near the rear partition wall 9.

The rear end of probe 5 carries contact element 18 continuously in sliding contact with an elongated resistor 19 suitably secured within unit A. The probe portion carrying contact 18 and the resistor together form a rheostat connected in series with an E. M. F. source and indicator unit C. The unit C may be an ordinary ammeter but the scale thereof is calibrated to read in Mach numbers from zero to unity.

In order to reduce the air drag on probe 5 there is provided a hollow shield 20 slotted along the side at 21, to allow the static pressures in the nozzle to be effective at port 11. The shield 20 may be secured within the unit A in any suitable manner, but as illustrated the shield is fastened to the partition wall 8.

In operation of the apparatus the nozzle, throat and diffuser are designed to obtain a state of sonic velocity in the throat at all relative air speeds over a certain minimum, in fact with a highly efficient vacuum pump connected to the diffuser, as shown in Fig. 1, a condition of sonic velocity in the throat may be obtained at all relative air speeds. At any constant speed and barometric pressure there will be a decrease of static pressure in the nozzle toward the throat, but with increases in relative air speed these static pressures will increase uniformly in a correctly designed nozzle. However since the stream static pressure at opening 16 in the outer wall of housing unit A is constant at constant barometric pressure regardless of speed, the nozzle static pressure corresponding to stream static pressure must be found nearer the throat as the relative air speed is increased. In other words, as relative air speed past the unit A increases, the probe 5 will move toward the throat to seek the static pressure in the nozzle equal to the constant stream static pressure. This is accomplished by the piston carried by the probe, because increase in speed will cause increase in pressure on the forward side of piston 13 to move the piston and probe rearwardly until the pressures on the piston become equalized. On decrease in relative air speed the reverse action will take place, and the probe 5 will move forwardly.

When the relative air stream velocity past unit A reaches the local velocity of sound the stream static pressure will still remain constant at constant barometric pressure, or altitude, but the probe port 11 must seek the throat location in order to find a static pressure equal to the stream static pressure, as found at opening 16.

The probe movement will ordinarily be limited by the piston travel as shown, but in case the probe is free to allow port 11 to move rearwardly of the throat section, the port 11 will register an even lower static pressure than in the throat for a constant relative air speed, since the air passing from the throat will reach supersonic velocity with an efficient diffuser and vacuum pump. Thus, if the port 11 should override the throat on sudden rearward movement, the reduced static pressure will automatically cause forward movement of the piston to correct the overriding movement. In any case it should be understood that for any constant air stream velocity the pressures on the piston will become equalized and the probe will come to rest until some further change in air speed.

In deriving a mathematical expression for the performance of the present indicating apparatus three basic relations are relied on, which are:

1. Bernoulli's equation for compressible gas flow.
2. Continuity of mass flow.
3. Thermodynamic relation in adiabatic flow.

The resulting equation is:

$$\frac{S_t}{S_x} = \frac{M_x}{M_t}\left(\frac{1+\frac{k-1}{2}M_t^2}{1+\frac{k-1}{2}M_x^2}\right)^{\frac{k+1}{2(k-1)}}$$

$S_t$ and $M_t$ are throat area and throat Mach number respectively.
$S_x$ and $M_x$ are area and Mach number respectively at any point X along nozzle.
$k$ (gamma) is ratio of specific heats for air and equals 1.400.

For all Mach numbers above a minimum as determined by the efficiency of the diffuser and vacuum pump, sonic velocity will exist at the throat section, or in other terms $M_t=1$. The above equation may then be simplified to obtain:

$$\frac{S_t}{S_x} = M_x\left(\frac{1+\frac{k-1}{2}}{1+\frac{k-1}{2}M_x^2}\right)^{\frac{k+1}{2(k-1)}}$$

This final equation demonstrates that for a fixed geometric shape of the nozzle there can be only a single Mach number for each point along the nozzle axis, while sonic velocity is maintained at the throat.

This equation is useful in proportioning the nozzle in order to obtain an apparatus in which the increase or decrease in Mach numbers will be directly proportional to displacement of the probe, and in which the deflection of the indicator C will consequently be in direct proportion to the changes in Mach numbers. This will make the apparatus easier to calibrate and the indicator will also be easier to read at a glance. The above equations will be more fully explained below.

In the modified structure of Fig. 3 there is disclosed an indicating apparatus which largely eliminates the friction and inertia present in the previously described device. The principles of operation are similar to the apparatus of Figs. 1 and 2. However, instead of the static pressures operating to move a piston, the static pressures of the present embodiment actuate a light diaphragm adapted to control a probe operating motor.

Considering Fig. 3 more closely there is shown the units A, B and C as before. The unit A forms a housing to be mounted in the air stream, and encloses all working parts except the units B and C. The unit A has a nozzle 1' through which air enters and passes to throat 2' of minimum diameter, the throat in turn opening into diffuser 3', which extends into a chamber connected by a duct 4' to vacuum pump B. Slidably mounted on the longitudinal axis of the unit A there is a thin probe element 5' having a longitudinal passage 10' therethrough opening at its ends to ports 11' and 12'. A square section 6' on probe 5' is slidably mounted in a bearing 7' carried by wall 8', and by this arrangement any rotative movement of the probe is prevented. The rear end of the probe is screw threaded at 13' for longitudinal movement by means of a feed nut 14' mounted on sleeve 15', the latter being rotatable by means of a reducing gear box 16' and a motor 17'. The motor is of the forward and reverse type usually having a double field winding.

The motor control means comprises a chamber 18' within which is mounted a diaphragm 19' through which a circuit may be completed to contacts 20' or 21' to cause forward or reverse motor rotation. The diaphragm is actuated by static air pressure on either side thereof transmitted by conduits 22' or 23'. Conduit 22' transmits the probe static pressure at port 12', while conduit 23' transmits the free stream static air pressure at aperture 24' in the side wall of unit A. The conduit 22' carrying the probe static pressure is a flexible tube to permit back and forth movement of the probe when the motor circuits are closed by deflection of the diaphragm 19'. Connected between the diaphragm and the motor is a suitable low voltage source of electric power, shown in Fig. 3 as a battery.

In order to read the variations of Mach number on the visual indicator C, the unit A includes a variable resistor 25' carried on wall 8', and contacted by projection 26' on the probe 5'. In the indicating circuit with the variable resistor and meter C is a battery or other suitable current source. The meter C is built like an ordinary ammeter but of course if the current through the resistor 25' is applied to a resistance unit, a voltmeter may be used to measure the voltage drop across the resistance. This will serve just as well as an ammeter to measure the Mach numbers, upon calibration of the indicating unit.

In operation of the apparatus an increase in nozzle static pressure upon increase in relative air speed past the unit A, will close the motor circuit through contact 21'. Closing the circuit through contact 21' will start motor rotation in a direction to draw the probe farther into sleeve 15' and thus cause port 11' to move into a position of lower static pressure and thus tend to bring the diaphragm 19' back to a neutral position in which the motor circuit is open. If in moving rearwardly the probe should override a position in which the stream static pressure and the nozzle static pressure are equal, the nozzle pressure taken at port 11' in the nozzle will be reduced to such an extent that contact 20' will be engaged by diaphragm 19' to close the motor circuit and rotate the feed nut 14' in such a direction as to move the probe forwardly for correction of the overriding. Overriding in either direction will thus be automatically corrected, and with constant air temperature and pressure, and with the velocity of the air stream held constant, the probe will always reach a stabilized rest position. Furthermore a position of rest of the probe will be evident in the indicating means, and at such positions of rest it will follow that the nozzle static pressure and stream static pressure are equal.

When the relative velocity of the air stream past the unit A reaches the local velocity of sound in the ambient atmosphere, the pressures on the diaphragm 19' can be equalized only by the probe port 11' seeking the throat location where air is moving at sonic velocity at all times. When the probe port reaches this position the Mach number reading on indicating unit C must be unity, since the relative velocity of the air stream and the local velocity of sound are now equal.

By the use of the diaphragm switch and motor operated probe the static pressures are not required to work against the friction of moving parts, nor are they required to overcome the inertia of the probe element itself. The diaphragm device is adapted to detect very slight pressure differences, making the apparatus one of great sensitivity and one which will indicate Mach numbers without any appreciable time lag.

In a further form of the invention shown in Figs. 4 and 5 the apparatus is simplified by omission of the central probe element and operating parts therefor. At the same time the visual indicating means is modified. As in the previously described forms, the present apparatus embodies three main parts: the housing unit A1, the vacuum pump B, and the visual indicating means C1.

The housing unit A1 in the present form of the invention comprises a nozzle element 30, diffuser element 31 and two outer sleeve elements 32 and 33, the latter two elements having a threaded connection as indicated at 34. The rear end of the sleeve 33 has a conduit 35 secured thereto, as by welding or brazing, this conduit being in turn connected to the vacuum pump B. The nozzle 30 is ported at 36 and 36', and these ports connect through conduits 37 and 37' to the diaphragm chambers 40 and 41. The outer surface of the sleeve 33 also has ports 38 and 38', located at the same distance from the forward end of the nozzle. The two ports 38 and 38', which are exposed to the stream static pressure, connect with conduits 39 and 39' leading to the diaphragm chambers 40 and 41 at the sides of the diaphragms opposite to that connected to conduits 37 and 37' carrying the nozzle static pressures.

The visual indicating means C1 comprises the diaphragm chambers 40 and 41 having lamp circuits I1 and I2 connected thereto, the lamps preferably being mounted behind different colored lenses. These lenses may also be labeled with predetermined Mach numbers, such as 0.6 and 0.8 for instance. The arrangement shown is adapted to indicate a larger number of steps simply by employing more nozzle ports spaced apart longitudinally and connected to additional diaphragm chambers, each having a lamp circuit as shown in Fig. 4. While the construction illustrated employs two separate stream static pressure ports and conduits, these ports may be interconnected if desired, since they have the same location longitudinally of the housing unit. By the use of a multiplicity of these similar ports all interconnected, reliability of the apparatus is promoted especially where it operates under icing conditions.

The operation is in accordance with the principles and formula set out above, since as previously explained each point in the nozzle or choke will correspond to only one Mach number while sonic velocity is maintained in the throat of the unit A1. Until a fairly high air velocity has been reached the stream static pressure will be greater than the nozzle static pressure at ports 36 and 36', and the contacts in the diaphragm chambers 40 and 41 will be open (see Fig. 4). However at a sufficiently high velocity of the air stream the pressure at nozzle port 36' will become equal to the stream static pressure and the diaphragm in chamber 41 will close the lamp circuit I2, to correspond with a predetermined Mach number of say 0.6.

The nozzle static pressure at ports rearwardly of any given port will now be progressively lower for constant conditions of temperature, barometric pressure and air speed. As the air speed is increased further the nozzle static pressure at the next port rearwardly will be increased sufficiently to operate its diaphragm and thus indicate by a lamp the Mach number corresponding to the port under consideration. The series of lamps used will thus be lighted progressively as the relative air stream velocity increases, and will remain lighted until the velocity is decreased.

The form of the invention shown in Figs. 6, 7 and 8 is similar to the form just described but eliminates the vacuum pump entirely. This embodiment thus comprises only a housing unit A2 to be mounted in the air stream and an indicating unit C2. The latter, as illustrated in Fig. 6, comprises a case or panel having lamps L1, L2 and L3 carried thereon and exposed to view at the front of the panel.

The housing A2 comprises a nozzle element 50, diffuser element 51 and two outer sleeve elements 52 and 53, the latter elements having a threaded connection as indicated at 54. In assembling the elements 50, 51, 52 and 53, the diffuser 51 is first inserted into the sleeve 53 through the forward end thereof until the rear end of the diffuser seats against a shoulder or bead on the inside of the sleeve 53 at the rear end thereof, a portion of the bead being indicated at 55. The sleeve 52 is then fitted over the nozzle 50 and threaded onto the sleeve 53. The shouldered engagement of the nozzle 50 and sleeve 52, as indicated at 56, maintains the nozzle in place and also retains the diffuser in the sleeve 53.

In the present form of apparatus the nozzle is provided with three ports equally spaced circumferentially but at different distances from the forward end of the nozzle. Each of these ports, one of which is indicated at 57, connect to conduits 58, 59 and 60 leading to indicating unit C2. The wall of sleeve 53 is ported at 61 and 61' to connect the annular chamber 62 to the stream static pressure. A conduit 63 extends into chamber 62 to conduct the stream static pressure to the indicating unit C2.

The indicating unit C2 includes a lamp for each nozzle port and also a diaphragm chamber, or other pressure responsive device, to actuate each lamp circuit separately and independently as explained above in connection with the apparatus of Fig. 4. The stream static pressure for each diaphragm chamber is obtained from the single conduit 63, this pressure always being constant at a given temperature and barometric pressure regardless of the relative air stream velocity.

The unit A2 of the present form has its diffuser 51 open at the rear end to allow air flowing through the nozzle and throat to pass directly through the unit A2. The air stream flowing past the unit on the outside produces a substantial suction effect at the rear open end of the unit, giving the effect of a vacuum pump at fairly high air speeds. It has been found by experiment that this suction effect provides a satisfactory substitute for a vacuum pump at all relative air speeds corresponding to a Mach number of 0.4 or greater, and for all numbers above this minimum the apparatus as described is fully as accurate and effective as if there were a vacuum pump connected to the diffuser. The diffuser 51 should have a smoothly diverging wall formation toward the rear end thereof, to allow as much expansion of the air as possible after it passes the throat. In this form of apparatus there are no moving parts which may get out of order, with the possible exception of the components making up the indicating unit C2.

The operation is substantially the same as in the forms using a vacuum pump, since the lamps L1, L2 and L3 are arranged to light up as the Mach number values increase, the lamp L1 coming on at say 0.6, the lamp L2 at 0.7, and the lamp L3 at 0.8. On decrease of the relative air speed, other conditions remaining constant, the lamp L3 will go out first, lamp L2 will go out next, and lamp L1 will go out last. Of course in accordance with the previously developed theory of operation, it will be clear that the nozzle ports actuating these lamp circuits will be distributed in such manner that the port for lamp L1 will be closest to the front or mouth of the nozzle, the port for lamp L2 will be farther from the mouth of the nozzle and the port for lamp L3 will be farthest from the mouth.

The present indicating apparatus in all its forms is suitable for use on aircraft, in wind tunnel measurements or in other fluid flow measurement work. One application in wind tunnel operation is in determining the extent of air turbulence. Neglecting the slight friction loss between the moving air and the tunnel walls, any loss of head between selected points in the tunnel will represent a friction loss due to turbulence in the moving air. With conditions of steady flow the Mach numbers at selected points may first be determined, and from the difference in Mach numbers between any two selected points the loss of head may be calculated.

The indicating apparatus in some of the forms illustrated includes a vacuum pump but it should be emphasized that the source of such vacuum may vary to some extent. Any known type of vacuum pump may be employed and in cases where the apparatus is mounted on aircraft in the air stream, the vacuum system of the plane itself may be connected to the diffuser. It is to be understood also that the nozzle, throat and diffuser, which together form a Venturi tube, may vary in shape to some extent. For instance the diffuser may in all forms of the invention take the shape of a chamber expanding gradually from the throat, and may lead directly into a vacuum pump intake. Also as explained in connection with the simplified apparatus of Figs. 6 to 8, the separate vacuum pump may be omitted entirely with a reduction in operating range. With high-speed air flow the portion of Mach number range below 0.4 is not of much significance, and above that value the apparatus not having a vacuum pump associated therewith is accurate and reliable.

In further explanation of the simplified apparatus (Figs. 6 to 8) it should be noted that maintenance of sonic velocity in the throat section is brought about primarily by providing an efficient diffuser rearwardly of the throat section, which permits efficient increase from the throat static pressure to the stream static pressure at the open rear end of the diffuser. Thus, with a given minimum ratio of total pressure at the mouth of the nozzle to the stream static pressure, sonic velocity will exist at the throat section and for all values of this ratio above the minimum, which minimum is determined by the efficiency of the diffuser, sonic velocity will exist in the throat section. The total pressure is the pressure that would exist if the air were brought to rest, and is also equal to the sum of the stream static pressure and the velocity head.

Another feature in all the described forms of the apparatus is the inherent stability under vibration. The housing units, particularly in the forms shown in Figs. 4 to 8, have no moving elements which are subject to vibration or shock, such as might occur in mounting the units on struts projecting into the free air stream.

In order to make the present disclosure more complete a derivation of the equations stated in the first part of the description is presented herewith. Starting with the following expression of Bernoulli's equation for compressible gas flow as found on page 369 (Equation 20) of "Fluid Mechanics" by Dodge and Thompson (First Edition 1937), the derivation will be followed logically and the implications of the final results will be explained.

$$P_s = P_o\left(1 + \frac{k-1}{2}\frac{V_o^2}{C_o^2}\right)^{\frac{k}{k-1}} \quad (1)$$

where:

$P_s$ is the stagnation or stop pressure of the air stream.
$P_o$ is the stream static pressure.
$k$ (gamma) is the ratio of specific heats for air at constant volume and at constant pressure and equals 1.400.
$V_o$ is the velocity of the air stream.
$C_o$ the velocity of sound in the local medium, is equal to the radical $$\sqrt{\frac{kP_o}{e_o}}$$

wherein $e_o$ is the mass density of the free air. Here the letter $e$ stands for rho for convenience.

For any point $x$ in the Venturi tube and for the throat location, $t$, the above equation becomes:

$$P_s = P_x\left(1 + \frac{k-1}{2}\frac{V_x^2}{C_x^2}\right)^{\frac{k}{k-1}}$$

$$P_s = P_t\left(1 + \frac{k-1}{2}\frac{V_t^2}{C_t^2}\right)^{\frac{k}{k-1}}$$

Combining these two equations the result is:

$$\frac{P_s}{P_s} = 1 = \left(\frac{P_x}{P_t}\right)\frac{\left(1+\frac{k-1}{2}\frac{V_x^2}{C_x^2}\right)^{\frac{k}{k-1}}}{\left(1+\frac{k-1}{2}\frac{V_t^2}{C_t^2}\right)^{\frac{k}{k-1}}}$$

Since $$\frac{V}{C} = M$$

where M is the Mach number, then:

$$\frac{P_x}{P_t} = \left(\frac{1+\frac{k-1}{2}M_t^2}{1+\frac{k-1}{2}M_x^2}\right)^{\frac{k}{k-1}}$$

In accordance with the continuity of mass flow:

$$S_x e_x V_x = S_t e_t V_t \quad (2)$$

where:

S is the cross sectional area.
e is the mass density of air.
V is the velocity of air flow.

In accordance with the thermodynamic relation in adiabatic flow:

$$P_x\left(\frac{1}{e_x}\right)^k = P_s\left(\frac{1}{e_t}\right)^k \quad (3)$$

Combining Equations 2 and 3 the result obtained is:

$$\frac{P_x}{P_t} = \frac{\left(\frac{1}{e_t}\right)^k}{\left(\frac{1}{e_x}\right)^k} = \left(\frac{e_x}{e_t}\right)^k = \left(\frac{S_t V_t}{S_x V_x}\right)^k$$

Substituting in the final form of Equation 1:

$$\left(\frac{S_t V_t}{S_x V_x}\right)^k = \frac{\left(1+\frac{k-1}{2}M_t\right)^{\frac{k}{k-1}}}{\left(1+\frac{k-1}{2}M_x\right)^{\frac{k}{k-1}}}$$

$$\frac{S_t V_t}{S_x V_x} = \frac{\left(1+\frac{k-1}{2}M_t^2\right)^{\frac{1}{k-1}}}{\left(1+\frac{k-1}{2}M_x^2\right)^{\frac{1}{k-1}}}$$

$$\frac{S_t}{S_x} = \frac{V_x}{V_t}\frac{\left(1+\frac{k-1}{2}M_t^2\right)^{\frac{1}{k-1}}}{\left(1+\frac{k-1}{2}M_x^2\right)^{\frac{1}{k-1}}}$$

Since $$C = \sqrt{\frac{kP}{e}} \text{ and } M_x = \frac{V_x}{\sqrt{\frac{kP_x}{e_x}}} \text{ and } V_x = \sqrt{\frac{kP_x}{e_x}}M_x$$

$$\frac{S_t}{S_x} = \frac{M_x}{M_t}\left(\frac{P_x e_t}{P_t e_x}\right)^{\frac{1}{2}}\left(\frac{1+\frac{k-1}{2}M_t^2}{1+\frac{k-1}{2}M_x^2}\right)^{\frac{1}{k-1}} \quad (A)$$

$$\left(\frac{P_x}{P_t}\right)^{\frac{1}{2}} = \left(\frac{1+\frac{k-1}{2}M_t^2}{1+\frac{k-1}{2}M_x^2}\right)^{\frac{k}{2(k-1)}} \quad (B)$$

Since $$\left(\frac{e_x}{e_t}\right)^k = \frac{P_x}{P_t} \text{ and } \frac{e_x}{e_t} = \left(\frac{P_x}{P_t}\right)^{\frac{1}{k}}$$

Then $$\left(\frac{e_t}{e_x}\right)^{\frac{1}{2}} = \left(\frac{P_x}{P_t}\right)^{\frac{-1}{2k}}$$

and:

$$\left(\frac{e_t}{e_x}\right)^{\frac{1}{2}} = \left(\frac{1+\frac{k-1}{2}M_t^2}{1+\frac{k-1}{2}M_x^2}\right)^{\frac{-1}{2(k-1)}} \quad (C)$$

Combining Equations A, B, and C the result is:

$$\frac{S_t}{S_x} = \frac{M_x}{M_t}\left(\frac{1+\frac{k-1}{2}M_t^2}{1+\frac{k-1}{2}M_x^2}\right)^{\frac{k+1}{2(k-1)}}$$

This is the same equation or formula as that originally stated in the present description. As noted previously the throat Mach number will be unity with sonic velocity at the throat. Since $M_t=1$ then:

$$\frac{S_t}{S_x}=M_x\left(\frac{1+\frac{k-1}{2}}{1+\frac{k-1}{2}M_x^2}\right)^{\frac{k+1}{2(k-1)}} \quad (D)$$

Thus a final formula is available to use in designing the Venturi tube to give results which may be predetermined and which will result in a straight line indication if properly applied in proportioning the tube at various selected points along the inside surface thereof.

Of further significance is the relation:

$$P_t=\frac{P_s}{\left(1+\frac{k-1}{2}M_t^2\right)^{\frac{k}{k-1}}}$$

obtained by rearranging the Bernoulli equation found above. In this equation $M_t=1$ and $k=1.4$ and by substitution:

$$P_t=0.528P_s$$

This demonstrates that as long as the throat pressure is about half of the stop pressure of the air stream there will be unity Mach number at the Venturi throat. This presents no difficulty since any good vacuum pump will serve to reduce the air pressure rearwardly of the throat to this extent. There will never be any increase in Mach number at the throat above unity because of the dynamic behavior of flowing air through a nozzle having a restricted throat section, sometimes referred to as a Delaval nozzle. This is because there is a transition at the throat from subsonic air flow forwardly of the throat to supersonic air flow rearwardly thereof. For an explanation of this feature reference is made to pages 380 and 381 of "Supersonic Flow and Shock Waves" by Courant and Friedrichs (1948). Thus in the portion of the nozzle forwardly of the throat there is a gradually increasing Mach number toward the throat and also a gradually decreasing static pressure. This fact is used to provide a means of comparing static pressures of the free air stream and of the selected points in the tube up to the throat location. Because of the Equation D above it is clear that $M_x$ is a function of $$\frac{S_t}{S_x}$$

where $S_t$ and $S_x$ are cross sectional areas at the throat and a selected point respectively. Since the Mach number at the selected point is a direct function of the area ratio, any point in the tube up to and including the throat where the static pressure equals the free stream static pressure will have a Mach number equal to the free stream Mach number and this number will be given by Equation D, quantity $M_x$. In the above discussion the stagnation or stop pressure is the dynamic air pressure or that which is generated in bringing the moving air stream to a dead stop.

It has been shown above that:

$$P_s=P_o\left(1+\frac{k-1}{2}\frac{V_o^2}{C_o^2}\right)^{\frac{k}{k-1}}=P_x\left(1+\frac{k-1}{2}\frac{V_x^2}{C_x^2}\right)^{\frac{k}{k-1}}$$

and $$P_s=P_o\left(1+\frac{k-1}{2}M_o^2\right)^{\frac{k}{k-1}}=P_x\left(1+\frac{k-1}{2}M_x^2\right)^{\frac{k}{k-1}}$$

From these relations it may be seen that if $P_o=P_x$ then $M_o=M_x$. It has further been shown above that the Mach number at any point $x$ is a direct function of the area ratio $$\frac{S_t}{S_x}$$

From these relations between the various quantities it is obvious that for any point $x$ in the nozzle up to and including the throat where the static pressure ($P_x$) equals the free stream static pressure ($P_o$) the Mach number will equal the free stream Mach number and this number may be determined analytically by the equation:

$$\frac{S_t}{S_x}=M_x\left(\frac{1+\frac{k-1}{2}}{1+\frac{k-1}{2}M_x^2}\right)^{\frac{k-1}{2(k-1)}}$$

This equation is important in designing the nozzle and in determining the exact locations of points therealong which will correspond to predetermined Mach numbers, such as 0.6, 0.7, 0.8 and 0.9, so that the instrument may be calibrated without recourse to costly trial and error methods.

The action of the indicator as shown in Fig. 1 will now be summarized in the light of the above analysis and it will be assumed that the slidably mounted probe 5 is free to travel without endwise restrictions or stops. With a zero air stream velocity and with the vacuum pump B in operation the probe port 11 must seek a location outwardly or ahead of the tube 1 where the suction effect of the vacuum pump will not affect the air pressure. Now the static pressure at port 16 along the straight outer wall of the indicator body will balance the static pressure at probe port 11 and the contact element 18 will be at the forward limit of travel. Now considering the conditions at 200 miles per hour air stream velocity, the pressure build-up in the nozzle or tube 1 ahead of the nozzle throat will cause the pressure transmitted from the probe port 11 to move the probe and attached piston 13 rearwardly until the pressures on opposite sides of the piston are equalized and the probe port 11 takes a position, based on the reduced diameter of the tube, where the static pressure equals the free stream static pressure. The latter remains constant at constant altitude and constant temperature regardless of the air stream velocity. At still higher speed, say 500 miles per hour, the probe port 11 must seek a location still farther rearwardly to find a static pressure equal to that of the free air stream, and as the air stream velocity approaches the local speed of sound the only place where the probe port can find a static pressure equal to the free stream static pressure will be the throat location where there is a minimum cross sectional area and where the air velocity is equal to the speed of sound in the local medium. An approximate value for the speed of sound at sea level is 760 miles per hour. Needless to say the longitudinal contour of the nozzle between the limits of travel of the probe port 11 will be very critical in obtaining satisfactory and accurate results with the indicator. Thus the design equations stated above are important in working out a practical device. It is also noted that if the cross sectional area of the tube is held to a minimum, the capacity and size of the vacuum pump B may be held to a minimum.

The embodiments of the invention herein shown and described are to be regarded as illustrative only and it is to be understood that the invention is susceptible to variations, modifications and changes within the scope of the appended claims.

What we claim is:

1. An apparatus for indicating the velocity of a relatively moving air stream in terms of the local velocity of sound in the ambient atmosphere comprising, a housing having a nozzle at the forward end to receive a portion of the air stream, said nozzle having a rearwardly converging wall formation terminating in a constricted throat, a conduit having one end connected to said throat, means connected to the other end of said conduit to induce a suction in said conduit, means providing a static pressure port open to the air stream flowing outside said housing, means providing a plurality of static pressure ports in said nozzle longitudinally spaced along the nozzle at predetermined points, means for transmitting the static pressures at said ports to indicating means, and indicating means responsive to said static pressures and including mean adapted to indicate an equality of the air stream static pressure outside said housing and the nozzle static pressure at each of said nozzle ports.

2. An apparatus for indicating the velocity of a relatively moving air stream in terms of the local velocity of sound in the ambient atmosphere comprising, a tubular housing enclosing a nozzle at the forward end to receive a portion of the air stream, said nozzle having a rearwardly converging wall formation terminating in a constricted throat, a conduit having one end connected to said throat and having a rearwardly diverging wall formation leading to the open rearward end of said housing, means providing a static pressure port in the outside wall of said housing, means providing a plurality of static pressure ports in said nozzle longitudinally spaced along the nozzle at predetermined points, means for transmitting the static pressures at said ports to indicating means, and indicating means responsive to said static pressures and including mean adapted to indicate an equality of the air stream static pressure at said port in the outside wall of said housing and the nozzle static pressure at each of said nozzle ports.

3. An apparatus for indicating the velocity of a relatively moving air stream in terms of the velocity of sound in the atmosphere ambient to the apparatus comprising, a Venturi tube having a constricted throat section positioned downstream from the tube entrance, means for producing a pressure difference between the entrance and the throat of said tube such that the velocity of the air stream through the tube throat is equal to the local velocity of sound, means movable along the tube and having a port opening into said tube and shiftable between the tube throat and entrance, means having a static pressure opening therein exposed to the static pressure of the free air stream, differential pressure responsive means connected respectively to said port and to said static pressure opening and operatively connected to said movable means to shift the same to a point where the static pressures at the port and the opening are equal, and means actuated in response to movement of said movable means for indicating the position of said port in terms of the ratio of the velocity of the air stream to the velocity of sound in the ambient atmosphere.

4. An apparatus for indicating the velocity of a relatively moving air stream in terms of the velocity of sound in the atmosphere ambient to the apparatus comprising, a Venturi tube having a constricted throat section positioned downstream from the tube entrance, means for producing a pressure difference between the entrance and the throat of said tube such that the velocity of the air stream through the tube throat is equal to the local velocity of sound, probe means movable along the axis of said tube and having a port therein shiftable between the tube throat and entrance, means having static pressure openings therein exposed to the static pressure of the free air stream, differential pressure responsive means connected respectively to said port and to said static pressure openings and operatively connected to said probe means to shift the same along the axis of the venturi to a point where the static pressures at the port and said openings are equal, and means actuated in response to movement of said movable probe means for indicating the position of said port in terms of the ratio of the velocity of the air stream to the velocity of sound in the ambient atmosphere.

5. An apparatus for indicating the velocity of a relatively moving air stream in terms of the velocity of sound in the ambient atmosphere comprising, a chamber, a power driven vacuum pump connected to the chamber to evacuate the same, a Venturi tube positioned in the air stream with the throat downstream and discharging into said chamber, the pressure difference produced by said pump being maintained sufficient to produce local sonic velocity at the Venturi throat, a probe movable along the axis of the Venturi tube and having a port therein for measuring the static pressures along the axis of the Venturi tube, means having static pressure ports therein communicating with the ambient atmosphere, differential pressure responsive means connected to said ports and operative to shift the probe along the axis of the venturi to a point where the pressure at the port in the probe is equal to the static pressure of the ambient atmosphere and indicating means for indicating the position of the port along the axis of the Venturi tube in terms of the ratio of the air stream velocity to the velocity of sound in the ambient atmosphere.

6. In an apparatus for indicating the velocity of a relatively moving air stream in terms of the velocity of sound in the ambient atmosphere comprising, a Venturi tube having a constricted throat positioned downstream from the tube entrance, the cross sectional area of the tube varying between the entrance and throat such as to give a predetermined variation in static pressure along the axis of the tube in response to flow therethrough, a suction producing means connected to the Venturi throat and operative to produce a sonic velocity therethrough, means including a port positioned intermediate the entrance and throat of the venturi for measuring the static pressure at at least one point therealong, means including static pressure ports for measuring the free stream static pressure, and differential pressure responsive means connected to said ports.

7. An apparatus for indicating the velocity of a relatively moving air stream in terms of the velocity of sound in the atmosphere ambient to the apparatus comprising, a Venturi tube having a constricted throat section positioned downstream from the tube entrance, means for producing a pressure difference between the entrance and the throat of said tube such that the velocity of the air stream through the tube throat is equal to the local velocity of sound, probe means movable along the axis of said tube and having a port therein shiftable between the tube throat and entrance, means having a static pressure opening therein exposed to the static pressure of the free air stream, differential pressure responsive means including an expansible chamber motor connected to said port and to said static pressure opening and provided with a movable wall subjected to the differential in pressures between said port and said static pressure opening, a connection between said movable wall and said probe means, and means actuated in response to movement of said movable probe means for indicating the position of said port in terms of the ratio of the velocity of the air stream to the velocity of sound in the ambient atmosphere.

8. An apparatus for indicating the velocity of a relatively moving air stream in terms of the local velocity of sound in the atmosphere ambient to the apparatus comprising, a Venturi tube having a constricted throat section positioned downstream from the tube entrance with the longitudinal axis of said tube extending in the general direction of the air stream, means for producing a pressure difference between the entrance and the throat of said tube such that the velocity of the air stream through the tube throat is equal to the local velocity of sound, means having a static pressure opening therein exposed to the static pressure of the free air stream, apertured means to detect the static pressures within said tube at a plurality of spaced points upstream from the tube throat, differential pressure responsive means connected to said static pressure opening and to said apertured means, and indicating means actuated by said differential pressure responsive means for indicating the velocity of the free air stream in terms of the local velocity of sound when the static pressure within said tube at any one of said spaced points upstream from the tube throat is equal to the static pressure of the free air stream.

9. An apparatus for indicating the velocity of a relatively moving air stream in terms of the local velocity of sound in the ambient atmosphere comprising, a hollow member extending longitudinally in the same general direction as the air stream, a tube in said member at the forward end thereof to receive a portion of the air stream and having a rearwardly converging wall formation terminating in a constricted throat, a tubular diffuser connected to said throat to allow free passage of air from said throat, means to induce a suction in said diffuser for producing a pressure difference between the entrance and the throat of said tube such that the velocity of the air flow through the tube throat is equal to the local velocity of sound, means having a static pressure opening therein exposed to the static pressure of the free air stream flowing on the outside of said hollow member, apertured means to detect the static pressures within said tube at a plurality of spaced points upstream from the tube throat, differential pressure responsive means connected to said static pressure opening and to said apertured means, and indicating means actuated by said differential pressure responsive means for indicating the velocity of the free air stream in terms of the local velocity of sound when the static pressure within said tube at any one of said spaced points upstream from the tube throat is equal to the static pressure of the free air stream.

WILLIAM JAMES ORLIN.
HERBERT M. HEUVER.
ROBERT E. FORRESTER.

REFERENCES CITED

The following references are of record in the file of this patent:

UNITED STATES PATENTS

| Number | Name | Date |
|---|---|---|
| 1,311,798 | Bristol | July 29, 1919 |

FOREIGN PATENTS

| Number | Country | Date |
|---|---|---|
| 479,044 | Germany | July 6, 1929 |
| 488,992 | Germany | Jan. 11, 1930 |